Figure 1:
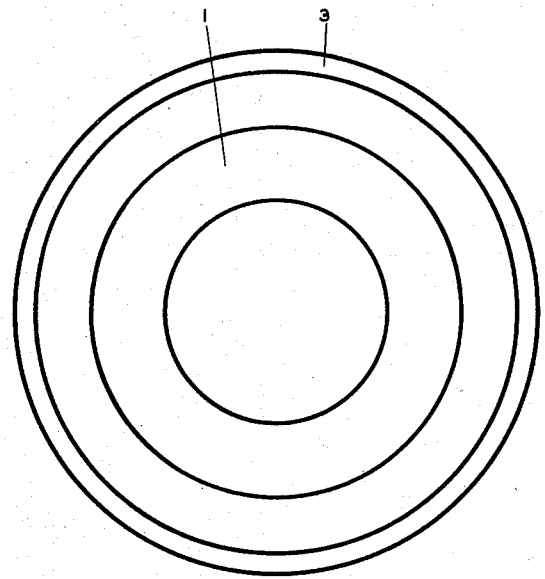

May 18, 1937.　　　R. E. GOULD　　　2,080,418
APPARATUS FOR MAKING CERAMIC ARTICLES
Filed March 9, 1936　　2 Sheets-Sheet 1

Robert E. Gould
INVENTOR

BY Arthur L. Davis
ATTORNEY

Patented May 18, 1937

2,080,418

UNITED STATES PATENT OFFICE 2,080,418

APPARATUS FOR MAKING CERAMIC ARTICLES

Robert E. Gould, Norris, Tenn., assignor to Tennessee Valley Authority, Wilson Dam, Ala., a corporation of the United States Application March 9, 1936, Serial No. 67,936

5 Claims. (Cl. 25—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to an apparatus for molding ceramic articles, particularly in the manufacture of flat, oval or round dinnerware which is molded from plastic raw ceramic material.

One of the objects of this invention is to provide an apparatus for molding ceramic articles from clay of low plasticity. Another object of this invention is to provide an apparatus for forming the obverse and reverse of molded ceramic articles simultaneously. Still another object of this invention is to provide an apparatus for the forming of molded ceramic articles which may be dried and fired without removing the molded article from the mold. Other objects of this invention include the provision of an apparatus for relieving the strains in molded ceramic ware by forming the top and bottom of the ware simultaneously.

In the manufacture of ceramic dinnerware the usual procedure consists in forming a round sheet of proper thickness from a plastic clay, impressing this sheet, either by hand or by throwing onto a plaster of paris mold having a profile which is complementary to one side of the finished ceramic article, placing the plaster mold covered with the clay into a machine which revolves on a vertical axis and forming the other side by cutting the revolving piece of clay with a metal tool having a profile complementary to exactly one-half the desired shape for the opposite side of the piece as formed by the face of the plaster mold.

As practically all dinnerware has a rim which is higher than the center, or well of the article, a flat sheet of plastic clay, or "bat" as it is called in the ceramic trade, must be distorted to conform with this shape. It is well known that the handling of the "bat", the unevenness of the distortion and the resulting strains which are set up are some of the primary causes of the finished ware being warped. The tendency towards distortion is aggravated with the increase in vitrification of the article, that is to say, after the molded article is fired, or burned, to the point where it is impervious to water and assumes a glass-like texture, the strains existing in the molded article will have a greater tendency to distort the shape of the finished ware than when the molded article is burned only to a semi-vitreous state.

I have discovered an apparatus for substantially eliminating the lack of uniformity of molded ceramic articles, cause either by entrapping air between the plastic clay from which the article is molded or by forming the top and bottom of the molded article in two separate operations, by simultaneously forming one side of the ceramic article from plastic clay in a gas pervious mold or a gas pervious mold covered with a gas pervious diaphragm and the other side of the article with a tool having a profile complementary to one-half of the profile of the top of the vertical section of the article while a sub-atmospheric pressure is applied to the bottom of the gas pervious mold.

Figure 2:
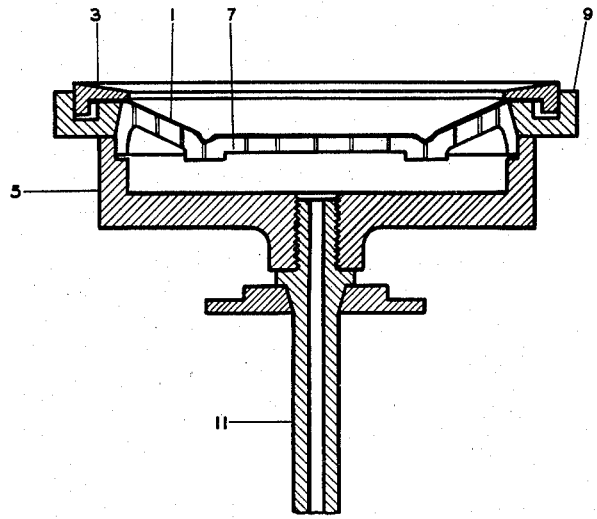
Figure 3:
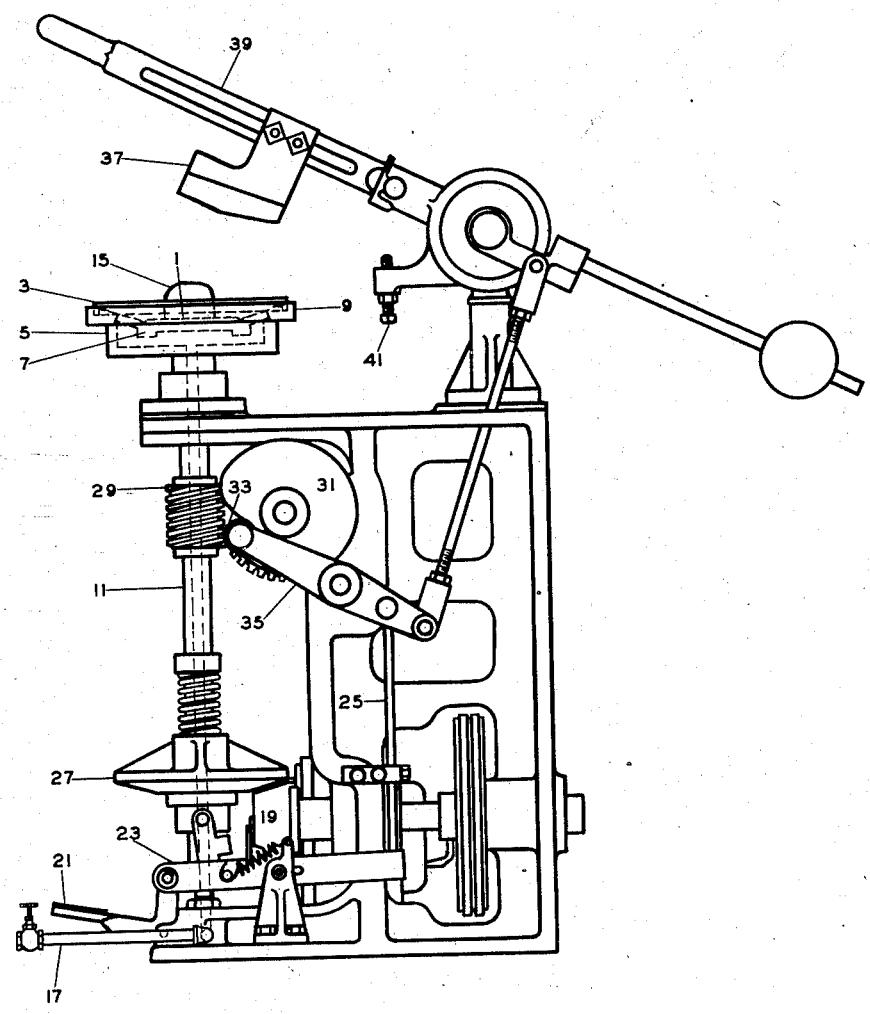

In the accompanying drawings which form a part of the specification and wherein reference symbols refer to like parts wherever they occur, Fig. 1 is a diagrammatic, plan view of a molding head for the embodiment of my invention, Fig. 2 is a diagrammatic, vertical, sectional view of the molding head shown in Fig. 1, Fig. 3 is a diagrammatic, side elevational view of one form of molding machine for the embodiment of my invention which includes the molding head shown in Fig. 1 and Fig. 2.

In Fig. 1, the gas pervious diaphragm 1, is shown held in place by ring clamp 3. In Fig. 2, the cylindrical shell 5, carries the diaphragm support 7, which is held in place by conical ring clamp 9. The top of the gas pervious support 7, is shaped complementary to the reverse side of the ware to be formed, with allowance being made for the thickness of the gas pervious diaphragm 1, which is placed over it. This diaphragm support 7, is drilled uniformly with one $\frac{1}{32}$" diameter hole per square inch of surface and, in addition, the same size holes are drilled on $\frac{3}{8}$" centers through that part of the support to be occupied by the foot of the dinnerware. A hollow shaft 11, which serves alternately as a vacuum and a pressure line, is centered in the base of the cylindrical shell 5. With the vacuum applied, the gas pervious diaphragm 1, secured by ring clamp 3, conforms to the shape of the diaphragm support 7.

In Fig. 3, a flat sheet of plastic clay 15, is placed on the gas pervious diaphragm 1, below which a sub-atmospheric pressure has been applied by means of a vacuum pump (not shown) connected to valved line 17, which is connected through the base of the machine frame to the lower end of the hollow shaft 11, by means of a packing gland. The driving motor (not shown) is started and the friction pinion 19, idles. Depressing the treadle 21, moves the bar 23, forward and away from contact with the rod 25. This causes the friction disc 27, to contact the friction pinion 19, causing the hollow shaft 11, to revolve. The worm 29, secured to the hollow shaft 11, revolves the cam 31, and the movement of this cam presses the roller 33, of the lever 35, down, which movement also brings the tool 37, fastened in the pull down 39, on to the sheet of plastic clay 15, which has been placed on the gas pervious diaphragm 1, the distance through which the tool 37, may travel being limited by the stop 41, contacting the frame of the machine. Then the tool 37, is held on the sheet of plastic clay 15, until a smooth finish is obtained and the cam 31, has made a complete revolution. The roller 33, of the lever 35, drops into the recess of the cam 31, and the pull down 39, is moved up to its highest position. At the same time, the rod 25, presses the bar 23, down into the friction disc 27, away from the friction pinion 19, and stops the machine. The tool 37, is raised by lifting lever 35. The valve in line 17, is closed and a plaster mold, complementary to the top of the molded article, is fitted on top of the article. The plaster mold and the molded article are removed from the gas pervious diaphragm 1, after the application of a slight super-atmospheric pressure supplied by a compressor (not shown) after opening the valve in line 17.

One example of the operation of my apparatus is given for the production of ceramic dinnerware. A hollow metal cylinder was prepared with one end shaped complementary to the reverse side of the ware to be formed, with allowance being made for the thickness of a gas pervious diaphragm of chamois skin to be subsequently placed over it. This end of the cylinder was drilled uniformly with one $\frac{1}{32}''$ diameter hole per square inch of surface and in addition the same size holes were drilled on $\frac{3}{8}''$ centers through the part of the mold to be occupied by the foot of the dinnerware. A hollow shaft was centered outside the other end of the cylinder and the completed cylinder was fitted into a standard jigger so that it could revolve around a predetermined vertical axis and the vacuum could be applied while the cylinder was in motion. The flexible gas pervious diaphragm of chamois skin was then placed over the end of the cylinder which served as a mold, held in place with a ring around and near the top of the cylinder, and then a vacuum of approximately 10'' of mercury was applied. A porcelain body clay of low plasticity containing approximately 35% water was made using a mixture of 50% by weight of coarse grained North Carolina primary kaolin, 25% by weight of quartz finer than 200 mesh and 25% by weight of feldspar finer than 200 mesh. A piece of this plastic clay was placed in approximately the center of the mold and the jigger set in motion. A tool with a profile complementary to exactly one-half of the profile of the vertical section of the article opposite the mold was brought down upon the clay and by the action of the revolving and lowering of the tool the clay was spun in the usual manner to form the molded article. As the operation of forming the article with the tool proceeded, the vacuum applied to the lower side of the diaphragm was increased until the pressure of approximately 15'' of mercury obtained at the time of the completion of the forming operation. A plaster mold corresponding exactly to the jiggered obverse of the molded article was inverted and fitted on the obverse of the molded article and the vacuum released. The plaster mold, the molded article and the gas pervious diaphragm were removed from the metal cylinder after applying a pressure of 1 to 2 pounds per square inch within the cylinder. The diaphragm was removed from the reverse of the molded article after a gentle spraying with water. The molded article on the plaster mold was dried for 3 hours at 176° F. (80° C.). The dried molded article was then fired for 6 hours at 1652° F. (900° C) in an electric kiln to the bisque state and then porcelain glazed and fired for 8 hours at 2588° F. (1420° C), in a reducing atmosphere.

It is evident that there are numerous factors which will influence conditions for the most satisfactory operation of my invention, the actual limits of which cannot be established except by a detailed study of each set of raw materials and of the intermediate and finished products involved.

The gas pervious diaphragm must be of such a material that it will stretch and conform to any reasonable preconceived shape such as the design of the top or bottom of a piece of dinnerware or the gas pervious diaphragm may be preformed to the shape required. This material must be sufficiently gas pervious so that gas will pass through it when either a moderate super-atmospheric pressure or a moderate sub-atmospheric pressure is applied to the diaphragm. Materials such as chamois skin, textile fabrics and other cellulose compositions have been found to be suitable for this purpose. Under conditions which require the use of less skilled labor or the use of materials of low plasticity molded diaphragms made of cellulose products conforming to the requirements of gas perviousness may be used. Under the latter circumstances, the molded article may be removed along with the diaphragm, the combination dried, and on firing the diaphragm burned and the molded article vitrified to the desired extent.

The diaphragm support may be so constructed that its use may be adapted to any standard type jigger. The support is preferably cylindrical or conical but its shape is immaterial as long as the following requirements are met: The top of the support is shaped to be complementary to the shape of one side of the molded article with allowances being made for the thickness or style of diaphragm used; the top of the support must be provided with uniform perforations produced by any convenient means with the perforations joined to a common outlet so that the sub-atmospheric pressure may be applied to the bottom of the diaphragm during the rotation of the support in the jigger while the molded article is being formed by the use of an appropriate tool. This support may be made by machining a suitable piece of material or by machining a casting especially designed for the purpose. The perforated diaphragms support proper may be removable in order that various designs of ceramic ware may be molded in any unit with a minimum change.

In the operation of my invention the gas pervious diaphragm is placed on the diaphragm support, held in place by a ring around and near the top of the support body and the vacuum applied so that the diaphragm adheres to the support and will make an accurate mold for one side of the ceramic article which is being produced. As the article is being formed by the action of the tool on the rotating mass of plastic clay, an increasing area of the diaphragm is covered until the diaphragm is completely covered. As the area of the diaphragm covered is increased the vacuum applied to the diaphragm can be increased since the plastic clay is less pervious to gas than the diaphragm used.

Under some circumstances it is sufficient only to provide a gas pervious diaphragm since this will permit entrapped air held between the plastic clay and the diaphragm to pass by virtue of the slightly super-atmospheric pressure produced during the shaping of the ceramic article with the tool. It is ordinarily more preferable, however, to start the operation with the proper shaping of the diaphragm using a vacuum in the order of 5″ of mercury. As the forming of the article proceeds this pressure may be increased materially. Under the conditions investigated a final pressure up to 20″ of mercury has been found suitable for the production of molded articles which have the proper characteristics when burned. The pressure used will vary depending upon the gas perviousness of the diaphragm, properties of the plastic clay used, the time required for forming and the time used for the application of the reduced pressure after the article has been formed. In any event it is necessary to have a negative pressure differential from the top to the bottom of the gas pervious diaphragm mold while the ceramic article is being molded. Ordinarily a plaster mold which is exactly complementary to the side of the article formed with the tool is fitted on to the side so formed, the ring holding the gas pervious diaphragm removed, the vacuum in the diaphragm support body released and a slight positive pressure applied. This causes the diaphragm to be released from the diaphragm support proper so that the plaster mold, the molded article and the diaphragm may be removed from the jigger assembly. Where the gas pervious diaphragm is chamois skin a moderate spraying with water permits it to be removed readily. The molded article is then dried on the plaster mold after which it is removed from the mold, fired, glazed and refired.

The plastic clay, which is molded, may consist of one or a plurality of mineral ingredients or chemical compounds suitable for this purpose.

In forming oval ware, the head, which carries the gas pervious diaphragm and support, moves eccentrically, as is customary in forming this specific class of ware from plastic material.

It will be seen, therefore, that this invention actually may be carried out by the modification of certain details without departing from its spirit or scope.

I claim:

1. In an apparatus for making ceramic articles in which one side of the article is formed on a rotatable molding head and the other side of the article is formed by a tool having a profile complementary to one-half the profile of the side of the vertical section of the article being formed by the tool as the head rotates, the combination which comprises, a rotatable head with, a cylindrical shell, a base at the bottom of the shell, a hollow shaft connected to the base and communicating with the interior of the head, a perforated diaphragm support fitted on top of the cylindrical shell, a conical ring clamp holding the diaphragm support in place, a thin, fluid pervious diaphragm of uniform thickness held in place in the diaphragm support, a ring clamp for holding the fluid pervious diaphragm in place, and means for alternately applying sub-atmospheric and super-atmospheric pressure beneath the fluid pervious diaphragm.

2. In an apparatus for making ceramic articles in which one side of the article is formed on a rotatable molding head and the other side of the article is formed by a tool having a profile complementary to one-half the profile of the side of the vertical section of the article being formed by the tool as the head rotates, the combination which comprises, a rotatable head with, a cylindrical shell, a base at the bottom of the shell, a hollow shaft connected to the base and communicating with the interior of the head, a perforated diaphragm support fitted on top of the cylindrical shell, a thin, fluid pervious diaphragm of uniform thickness held in place in the diaphragm support, means for alternately applying sub-atmospheric and super-atmospheric pressure beneath the fluid pervious diaphragm.

3. In an apparatus for making ceramic articles in which one side of the article is formed on a rotatable molding head and the other side of the article is formed by a tool having a profile complementary to one half the profile of the side of the vertical section of the article being formed by the tool as the head rotates, the combination which comprises, a hollow rotatable head with, a hollow shaft connected to the base and communicating with the interior of the head, a perforated diaphragm support fitted in the top of the head, a thin, fluid pervious diaphragm of chamois skin held in place in the diaphragm support, and means for alternately applying sub-atmospheric pressure and super-atmospheric pressure beneath the fluid pervious diaphragm.

4. In an apparatus for making ceramic articles in which one side of the article is formed on a rotatable molding head and the other side of the article is formed by a tool having a profile complementary to one half the profile of the side of the vertical section of the article being formed by the tool as the head rotates, the combination which comprises, a hollow rotatable head with, a hollow shaft connected to the base and communicating with the interior of the head, a perforated diaphragm support fitted in the top of the head, a thin, fluid pervious, combustible diaphragm of uniform thickness held in place in the diaphragm support, and means for applying sub-atmospheric pressure beneath the fluid pervious diaphragm.

5. In an apparatus for making ceramic articles in which one side of the article is formed on a rotatable molding head and the other side of the article is formed by a tool having a profile complementary to one half the profile of the side of the vertical section of the article being formed by the tool as the head rotates, the combination which comprises, a hollow shaft connected to the base and communicating with the interior of the head, a perforated diaphragm support fitted in the top of the head, a diaphragm of uniform thickness held in place in the diaphragm support, and means for alternately applying sub-atmospheric and super-atmospheric pressure beneath the diaphragm.

ROBERT E. GOULD.